2 Sheets—Sheet 2.
C. S. SHIVLER.
ELECTRO MAGNETIC RAILROAD SIGNALS.
No. 190,379. Patented May 1, 1877.
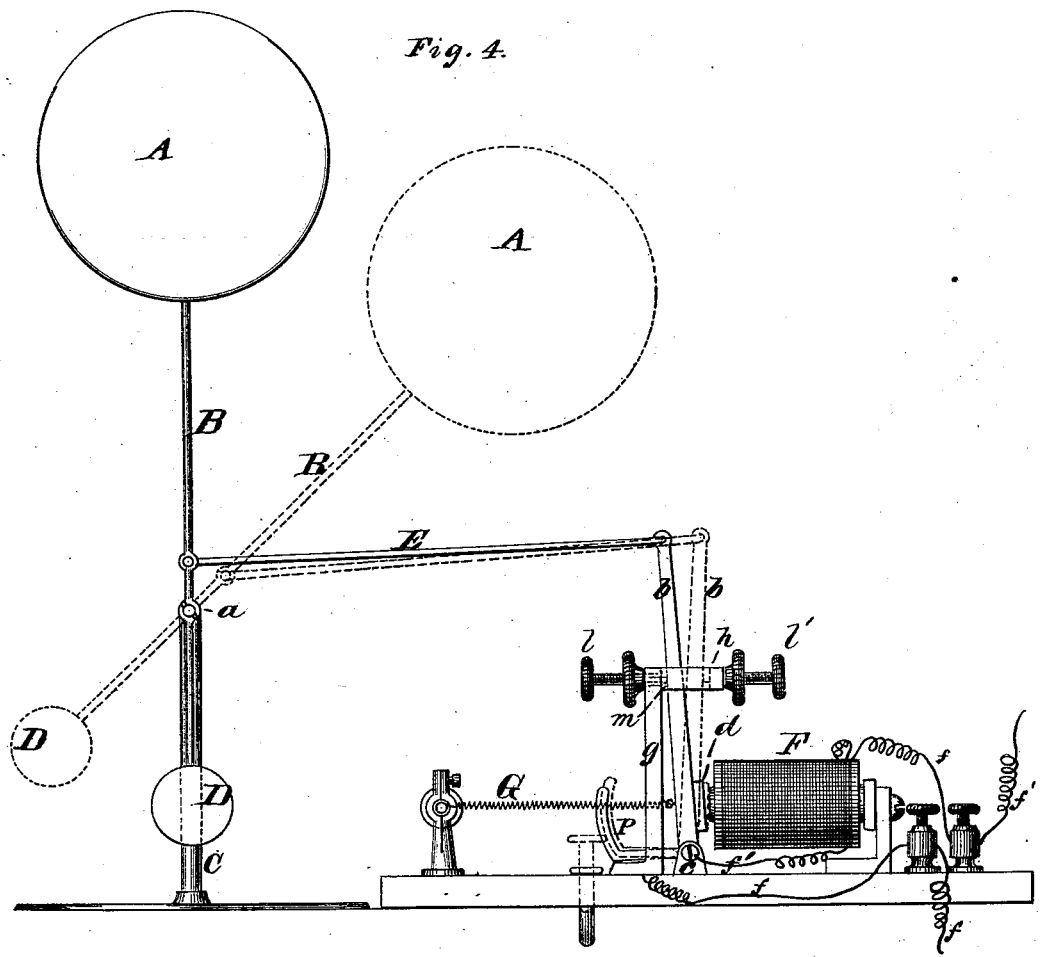
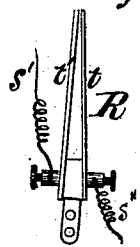
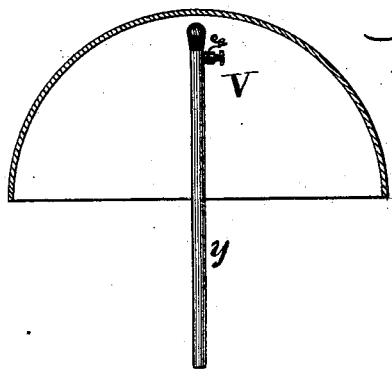
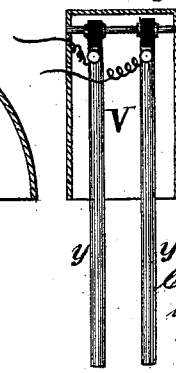
Witnesses
John Becker
Fred. Haynes
C. S. Shivler
by his Attorneys
Brown &
Allen
N. PETERS, PHOTO-LITHOGRAPHER WASHINGTON, D. C.

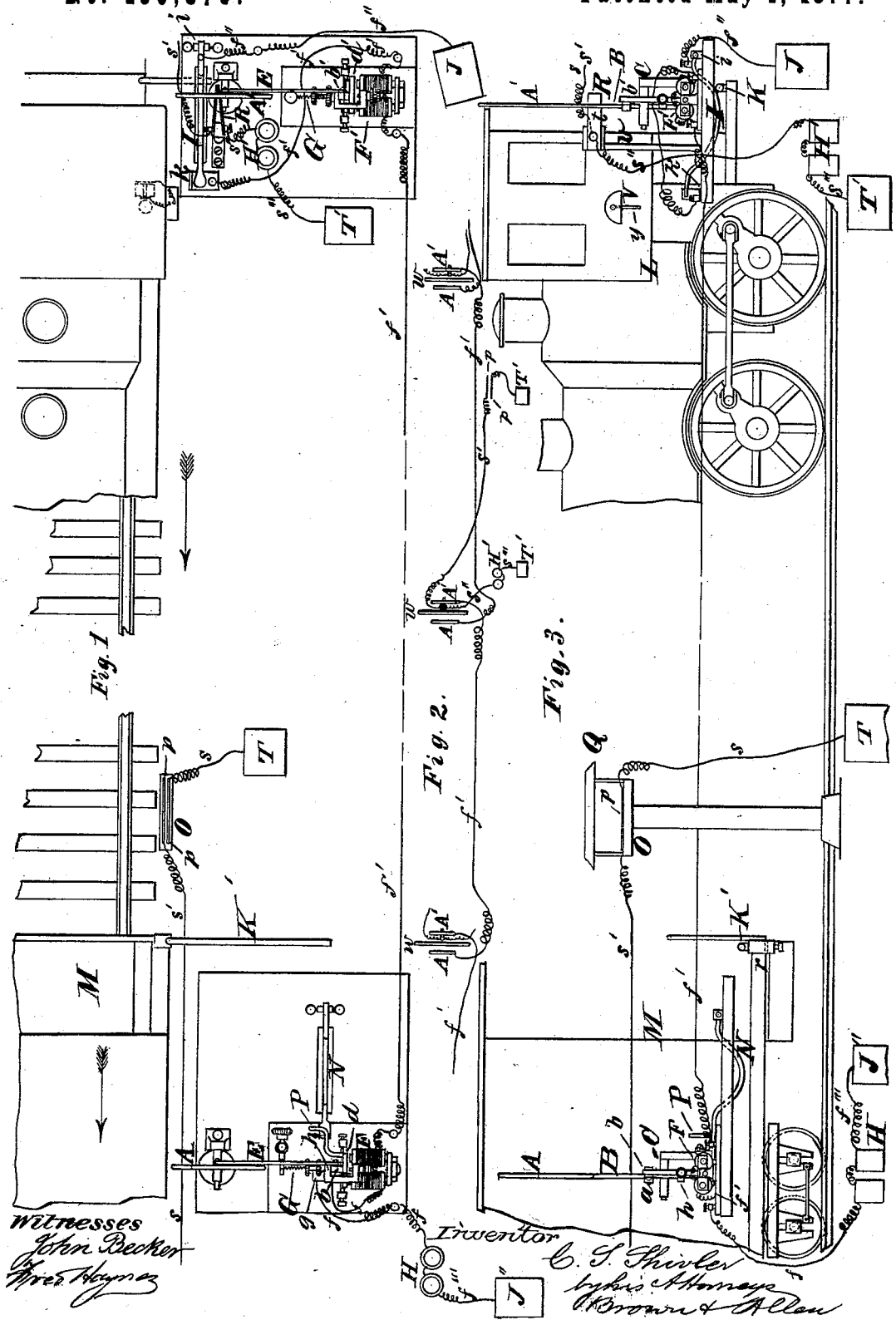

UNITED STATES PATENT OFFICE.

CHARLES S. SHIVLER, OF NEW YORK, N. Y.

IMPROVEMENT IN ELECTRO-MAGNETIC RAILROAD-SIGNALS.

Specification forming part of Letters Patent No. 190,379, dated May 1, 1877; application filed February 12, 1877.

*To all whom it may concern:*

Be it known that I, CHARLES S. SHIVLER, of the city, county, and State of New York, have invented an Improvement in Electric Railway-Signals; and I do hereby declare that the following is a full, clear, and exact description of the same, reference being had to the accompanying drawings, forming part of this specification.

My invention relates to that class of signals operated wholly or partially by electro-magnets, and controlled in their operation by the movement of railway-trains, locomotives, or cars, to give notice of safety or danger at railway-crossings, or placed at intervals along a line of railway to indicate conditions of safety or danger upon sections of such railway.

The invention has for its objects not only to indicate danger when danger exists, on account of the fact that a locomotive, train, or portion of a train is running over or standing upon a given section of a railway, but also to indicate danger arising from any incapacity of the signaling apparatus in itself to indicate the occupancy of such railway-section by such locomotive, train, or portion of a train.

The derangements which may arise in such a system of automatic electric railway-signals without external interference may arise either from want of action in the batteries which generate the electric currents, or from defects in the system of conductors which transmit the current through the helices of the magnets, arising from breakage, or from imperfect insulation. In my apparatus, when defects occur in either of the categories named, danger - signals are displayed or sounded, which first leads to investigation of the condition of the track, and if the track be found unobstructed the apparatus is itself examined, and the existing defect or defects therein remedied. To effect this desideratum, I have adopted the principle of displaying safety-signals only when the electric circuit is closed, and danger-signals only with an open or broken circuit. Should, therefore, the current from the batteries be weakened too much to charge the magnets with sufficient force, the danger-signals are displayed or sounded, as if the circuit were broken or opened, and should the circuit be intentionally opened by the rupture of a wire, or from failure of any of the circuit-closers to act, or from imperfect insulation, the danger-signals are automatically displayed.

My invention partly consists in a novel construction and arrangement of electric railway-signals in relation to the electro-magnets and conductors composing part of the system, partly in construction and arrangement of circuit closing and opening devices, partly in such a construction of one of the terminal signals and its attachments in relation with the electric circuit and the magnets that a removable operating-arm attached to the last car of a railway-train operates said terminal signal to indicate safety when the last car of the train passes off from said section, and at the same time closes the circuit to operate and hold the signal at the other end of the section to indicate safety, and to hold the signal first operated by said arm on said last car of the train in a position to indicate safety, until conditions of danger arise.

And my invention further consists in novel means for operating a sound-signaling apparatus placed on a locomotive, said sound-signal being operated at a suitable distance from that terminal signal which the train approaches to enter upon a given section, and which indicates danger or safety in said section, the apparatus for this purpose being partly fixed at the side of the railway-track and partly carried by a locomotive, and automatically operating in connection with the aforesaid terminal signal in such manner that when conditions of danger exist on the said section of railway, approached by said locomotive, as aforesaid, a signal shall be sounded on said locomotive at any required distance in advance of the terminus of the section upon which the locomotive is running, or the beginning of the next section to be run over by said locomotive.

Figure 1 in the accompanying drawings is a plan view of a railway-section having my invention applied thereto. Fig. 2 is a diagram illustrating the arrangement of the signals upon consecutive railway-sections. Fig. 3 is a side elevation of a portion of a locomotive standing or running on a railway-section and having portions of my invention thereto attached, and also a portion of a railway-car standing or running on such railway-section, and having portions of the apparatus attached to it. This figure also illustrates other details of the apparatus. Fig. 4 is an enlarged view of a portion of the apparatus which is placed at the end of the railway-section, out of which the train runs to enter the next consecutive section; but it also represents some of the principal features of the apparatus placed at the entrance of a railway-section, and will be referred to in describing the apparatus at both ends of such a section. In this specification I shall, hereafter, for sake of brevity, designate a railway-section by the single word "section." Figs. 5, 6, 7, and 8 are, respectively, enlarged detail views of parts of the apparatus, and will be hereinafter referred to.

I use for my system of electric railway-signals only one local circuit for each section of the road, and for the sound-signal on the locomotive only one circuit, which is partly through conducting-wires on the locomotive, and partly through wire and earth conductors placed as hereinafter described, the circuit for the local-section signals being opened by the entrance of the locomotive upon the section to which the circuit belongs, and closed by the passage of the last car of the train off from the section.

The current through the wire conductor of the local circuit for a section and the earth-current which completes the circuit are supplied from a suitable battery, H, Figs. 1 and 3. The current for operating the sound-signal on the locomotive is supplied from another separate and independent battery, H'.

The signals at the ends of each section are sight-signals—A A', Figs. 1, 2, 3, and 4, A representing the signal at that end of the section from which the train moves off in its normal progress, and A' the signal at the end of said section upon which the train enters upon said section.

The said sight-signals are placed at the upper ends of levers B, Figs. 3 and 4. Said levers are pivoted to a suitable support, C, at a, and have at their ends opposite the said signals attached weights D, Fig. 4, which, when said levers are left free to move, brings them into and maintains them in a vertical position.

In this position the said signals indicate danger, the position occupied by said signals under conditions of safety being that shown in dotted outline in Fig. 4.

The upper arm of each lever B is connected by a rod, E, Figs. 1 and 4, with the top of an oscillating armature-bearing lever, b, Fig. 4, or b', Figs. 1 and 3, pivoted at the bottom to a suitable support, c. Said armature-bearing lever b or b', Figs. 1 and 4, carries an armature, d or d', operated by an electro-magnet, F or F', Figs. 1, 3, and 4. When the electric circuit which imparts magnetic power to the said magnets is opened, (said magnets, when magnetized, holding the said armatures against the cores of the magnets, and, through the levers b or b' and the connecting-rods E, holding the signals in the safety position shown in dotted outline in Fig. 4,) said armatures are released, and the weights D, attached to the lower ends of the levers B, bring said levers into the vertical position and display the danger-signals at each end of the section.

Springs G, attached to the metallic levers b b', as shown in Figs. 1 and 4, assist the weights D in overcoming the residual force of the magnets, and cause the oscillations of the signal-levers B to cease quickly without shock, when the weights D act to bring said signal-levers into the vertical or "danger" position.

Thus far the apparatus, at the extremes of each section, is similar, and when the signal-levers B are set in the "safety" position, as shown in dotted outline in Fig. 4, and the circuit is closed, the said signal-levers are firmly held in such position by the action of the magnets upon the armature and the intervening mechanism.

The closed circuit consists of the battery H, Figs. 1 and 3; the wire f, Figs. 1, 2, and 4; the insulated metal post g, Figs. 1 and 4, connected with the wire f; the circuit closer h, Figs. 1, 3, 4, and 6, supported by the post g; the metallic armature-lever b; the insulated support c, Fig. 4, of the said lever; the wire f', including the helices of the magnets F and F'; the circuit-breaker I, Figs. 1 and 3; the wire f'' leading from the circuit-breaker I to the ground-plate J; the earth between the ground-plates J and J'', and the wire f''', which unites the battery H with the ground-plate J''. The direction of the current through this circuit does not affect the action of the apparatus.

The circuit-breaker I consists of a downwardly-bent metallic bar hinged at i, Figs. 1 and 3, to an insulated metallic plate connected with the wire f'', the end of said bar opposite said hinge i resting, when the circuit is closed, upon the metallic insulated support k.

The apparatus at each end of a railway-section is placed at the side of the track upon suitable supports, covered to protect it from the weather, and the proper insulations made to prevent the electric current from being led out of the circuit, as above described.

To some part of the locomotive L, Fig. 3, is attached a horizontal bar or lifter, K, projecting from said locomotive in such manner that when said locomotive enters the section to which the signals pertain, said lifter runs under and lifts that end of the hinged bar or circuit-breaker I which rests on the plate k and opens the circuit.

The circuit-breaker h, attached to the top of the metallic conducting-post g, Figs. 1 and 4, at the other end of the section, is shown more completely in Fig. 6. It consists of a rectangularly-bent piece, h, attached to the top, and a continuation of the said metallic post. The metallic screws $l$ $l'$, Figs. 4 and 6, are inserted in said circuit-breaker in such relation that the oscillating armature-lever $b$ abuts against the end of the screw $l'$ when the said lever is in the position shown in dotted outline in Fig. 4. Its armature $d$ is held by the magnet F, and when said armature-lever is in the position shown in full outline in Fig. 4, the said lever abuts against the screw $l$, the point of which is provided with an insulator, $m$, Figs. 4 and 6. Hence, when the said armature-lever rests against the screw $l'$ the circuit is closed, unless otherwise opened, and when the said lever abuts against the insulator $m$ the circuit is always open. On the interior of the circuit-breaker $h$ is fastened an insulated metallic spring, $n$, Fig. 6, against which the armature-lever $b$ presses in passing from the insulator $m$ to the point of the screw $l'$, and which, during such movement, closes the circuit before the contact of said armature-lever with said screw.

Firmly fixed to the lower part of said armature-lever $b$ is the upwardly-curved rocking lever P, so adjusted, in such relation with the downwardly-curved hinged lifting-lever N, Figs. 1 and 3, forming part of the signaling apparatus at the end of the section from which the train runs onto the next section, that, when said lifting-lever is raised, it slides over the upwardly-curved part of the said rocking lever P, and rocks the armature-lever $b$ from the position shown in full outline in Fig. 4 into the position shown in dotted outline.

The operation of the apparatus as thus far described, premising that the battery H is charged, and the signals set in the position of safety shown in dotted outline in Fig. 4, is as follows:

The circuit, hereinbefore described, is closed when the signals A A' are in the said safety position, and the signals are, therefore, held in said position as long as the circuit remains closed by the action of the magnets F F' upon the armatures $d$, attached to the armature-levers $b$ $b'$, connected with the weighted signal-levers B by the connecting-rods E.

When the locomotive L, Fig. 3, enters upon the section to which the signals pertain, the lifter K on said locomotive lifts the circuit-closer I from the insulated plate $k$, Figs. 1 and 3. This opens the circuit, the magnets cease to act, and the weights D, at the bottoms of the signal-levers B, bring said signal-levers at once into the vertical or danger position. This opening of the circuit at I also opens the circuit at the circuit-closer $h$ at the farther end of the section, the electric connection between the armature-lever $b$ and the screw $l'$, which form part of the circuit, as hereinbefore described, being sundered by the movement of said armature-lever from the screw $l'$, and the abutment of said armature-lever against the insulator $m$.

The circuit-closer I falls upon the plate $k$ as soon as the lifter K passes from under said circuit-closer; but as the circuit remains open at the circuit-closer $h$ at the farther end of the section, the signal-levers remain in the vertical or danger position till the last car M of the train carrying a horizontal lifting-bar, K', passing off the section, brings said lifting-bar under and against the lifting-lever N, which acts against the rocking lever P, which sets the signal A into the safety position, at the same time closing the circuit at $h$. The current being thus established through the line, the magnet F acts to hold its armature, and, through the armature-lever $b$ and connecting-rod E, the signal A and its weighted lever, in the safety position till the circuit is again opened, and the magnet F' also acting upon its armature and armature-lever and connecting-rod pulls and holds the signal A' in the safety position till the circuit is again opened.

Thus, the danger-signals are automatically set when a locomotive or train enters upon a railway-section, and the signals are set in the position of safety when the last car of the train passes off from said section.

I provide the lifter K' with a screw-clamp, $r$, Fig. 3, by which it is rendered removable from the car, and attachable to any car which, in the making up of a train, is placed in the rear. This is an important provision, for if any car but the last one is permitted to set the signals the breaking of a train may leave a portion of the same on the section after the signals have been set in the safety position. In the use of signals otherwise operated serious accidents have arisen from the leaving of a car or cars on the section after the signals have ceased to show danger.

It will be obvious, moreover, that with the construction and arrangement of the apparatus, as described, any derangement of the circuit which opens the same, or the failure of the battery to act, will set the armature free, and allow the signals to assume the position of danger.

To further insure safety I connect the signal A' at which the locomotive enters the section with a sound-signal on the locomotive, as follows:

At any desired distance in advance of the signal A' I place on a suitable support a platform, O, provided with a roof, Q, upon which are fastened and insulated two horizontal and parallel oblong flat metallic plates, $p$ $p$. From one of said plates leads off the conducting-wire $s$, Figs. 1 and 3, to the ground-plate T. From the second of said plates $p$ leads off a conducting-wire, $s'$, to a circuit-closer, R, Figs. 1, 3, and 5. Said circuit-closer is shown enlarged in Fig. 5. It consists of two insulated metallic springs, $t$ $t'$, Fig. 5, attached to a standard, $v$, Fig. 3. The spring $t'$ is attached to the conducting-wire $s'$, and the spring $t$ is attached to the wire $s''$.

The circuit-closer R is so placed that the lever B of the signal A', which is insulated, presses the two springs $t$ $t'$ together whenever said lever assumes the vertical or danger position. The circuit for the current from the separate battery H' is then established, except between the plates $p\ p$, where said circuit remains open till closed as hereinafter described.

The final closing of the said circuit, when the circuit-closer R is closed by the pressure of the lever B of the signal A, is effected by a circuit-closer attached to the locomotive, and connected with wires leading to an electro-magnetic sound-signaling apparatus of any approved kind placed on said locomotive.

The said locomotive circuit-closer is shown at V, Figs. 3, 7, and 8.

It consists of two swinging metallic rods, $y$, insulated from each other, and from the body of the locomotive, and connected by conducting-wires with the signaling apparatus on the said locomotive.

Said swinging rods only swing in a plane parallel with the course of the railway and the plates $p\ p$, and are adjusted in such relation with said plates that they are drawn over the surface of said plates when the locomotive passes the same; and if the circuit-closer R is, during such passing of the locomotive by the platform O, closed by the lever B of the entrance-signal A', as can only be the case when there is danger ahead, the circuit is completed from the battery H', through the sounding apparatus on the locomotive, and the engineer is warned by such signal before entering upon the section where conditions of danger exist.

This connection of the portable sound-signal with the local sight-signal established by the circuit-closer R is a very important check upon the carelessness of engineers running locomotives, as if, through inattention, they should fail to observe the sight-signal, the sound-signal will give timely and efficient warning. It is also a very important adjunct to sight-signals in foggy or obscure weather.

It will be seen that the action of the signals is practically simultaneous at both ends of the section.

In order that the engineer, when running on a section, may see only the signal pertaining to the entrance of the next consecutive section, I arrange the signals as shown in the Diagram Fig. 2, in which A' represents the signals placed at the entrances of sections for trains running in the direction indicated by the arrow in Fig. 1, and A the signals at the exits from the same sections, placed in front of the signals A', with partitions $w$ between each two contiguous signals. A' and A, the conducting-wires connecting the entrance-signal and exit-signals of consecutive sections crossing each other, as shown in Fig. 2. This arrangement makes the exit-signal for a train running in one direction on any section the entrance-signal for a train running in the opposite direction—a useful arrangement for single tracks, where trains run toward each other, and pass each other on turn-outs, or switch off on side tracks to allow one train to pass the other.

The apparatus is shown in the drawings placed lower than is the intention in practice, it being designed to place it all high enough above ground to prevent obstruction from frost or snow, or from willful tampering, and to house the signals properly to protect them from the effects of storms.

I claim—

1. The entrance-signal A' and the exit-signal A, placed at the ends of a railway-section, in combination with a battery, the conductor or conductors of an electric circuit, and two magnets, F F', for operating said signals; a circuit-closer, I, placed at the entrance of a railway-section, and operated to open the circuit by a lifter on the locomotive, and closing automatically when the locomotive has passed the same; a circuit-closer, $h$, so arranged at the exit of said railway-section that the movement toward the exit-signal-operating magnet F of its armature-lever shall close the circuit; two armature-levers, $b\ b'$, having armatures $d\ d'$, and connected with the levers of the signals A A'; a lever, P, rigidly connected with the armature-lever $b$; and a lifting device, N, operated by a lifter placed on the last car of the train, substantially as and for the purposes set forth.

2. The combination, with exit and entrance-signals operated by a battery and electro-magnets, of the plates $p\ p$ placed parallel to each other and the line of a railway-section, in advance of the entrance-signal thereof, and forming part of the circuit of an electric current, generated by a separate battery, H'; a circuit-closer, R, closed by the action of the lever B, in assuming the position of danger; the lever B of said signal, and a circuit-closer, V, attached to the locomotive, to act upon the plates $p\ p$, for closing the circuit of a sound-signaling apparatus carried by the locomotive, substantially as and for the purpose described.

CHARLES S. SHIVLER.

Witnesses:
BENJAMIN W. HOFFMAN,
FRED. HAYNES.